United States Patent
Nantz et al.

(10) Patent No.: US 6,911,904 B2
(45) Date of Patent: Jun. 28, 2005

(54) SYSTEM AND METHOD FOR ADAPTIVE VARIABLE MAGNETIC FIELD GENERATOR

(75) Inventors: John S. Nantz, Brighton, MI (US); Thomas J. Lemense, Farmington, MI (US); Qingfeng Tang, Novi, MI (US); Riad Ghabra, Dearborn Heights, MI (US); Ronald O. King, Brownstown, MI (US)

(73) Assignee: Lear Corporation, Southfield, MI (US)

( * ) Notice: Subject to any disclaimer, the term of this patent is extended or adjusted under 35 U.S.C. 154(b) by 281 days.

(21) Appl. No.: 10/233,953

(22) Filed: Sep. 3, 2002

(65) Prior Publication Data

US 2004/0041699 A1 Mar. 4, 2004

(51) Int. Cl.[7] .............................................. B60C 23/00
(52) U.S. Cl. ..................... 340/448; 340/445; 340/502; 340/504; 340/505; 340/3.5; 340/3.7; 340/825.52
(58) Field of Search ................................ 340/448, 445, 340/502, 505, 3.5, 3.7, 825.52, 504

(56) References Cited

U.S. PATENT DOCUMENTS

| | | | |
|---|---|---|---|
| 3,080,507 A | | 3/1963 | Wickerham et al. |
| 4,749,993 A | | 6/1988 | Szabo et al. ............ 340/870.31 |
| 4,819,543 A | * | 4/1989 | Leinen ....................... 91/363 R |
| 5,307,512 A | * | 4/1994 | Mitzlaff ........................ 455/126 |
| 5,697,073 A | * | 12/1997 | Daniel et al. ................ 455/126 |
| 6,612,165 B2 | * | 9/2003 | Juzswik et al. ............. 73/146.5 |
| 6,700,480 B2 | * | 3/2004 | Moore .......................... 340/445 |

FOREIGN PATENT DOCUMENTS

| | | |
|---|---|---|
| EP | 0209287 A1 | 1/1987 |
| EP | 0817183 A2 | 3/1996 |
| GB | 1095603 | 12/1967 |
| GB | 1324445 | 7/1973 |
| GB | 1600194 | 10/1981 |
| GB | 2112213 A | 7/1983 |
| GB | 2183098 A | 11/1985 |

* cited by examiner

Primary Examiner—Tai T. Nguyen
(74) Attorney, Agent, or Firm—Bill C. Panagos

(57) ABSTRACT

A system for controlling a magnetic field strength includes a magnetic field generator for generating a magnetic field for receipt by a responsive device and a controller in communication with the magnetic field generator for determining a strength of the magnetic field to a level sufficient for use in controlling the responsive device.

21 Claims, 3 Drawing Sheets

SYSTEM AND METHOD FOR ADAPTIVE VARIABLE MAGNETIC FIELD GENERATOR

BACKGROUND OF THE INVENTION

1. Field of the Invention

The present invention relates to magnetic field generators generally and, more particularly, to an adaptive variable magnetic field generator.

2. Background Art

Magnetic field generation devices, circuits and systems are implemented in connection with low frequency initiator (LFI) devices to perform a variety of wireless operations. In the case of a conventional vehicle tire pressure monitoring system, the operations performed via the LFI related operations can include system diagnostics, system reconfiguration for different environments and identification of tire relocation after tire rotation.

In the conventional tire pressure monitor system, an LFI is mounted near a respective tire. The LFI generates a magnetic field in response to information (i.e., signals) that are presented by a central control module in the vehicle where the tire pressure monitor system is implemented. Tire monitor devices (e.g., devices that include receivers that receive the LFI system signals and transmitters that present signals in response to pressure, temperature, etc.) are disposed within the respective tires. The LFI system includes a power supply, a data generator (or driver controller section), an output driver, and a resonant circuit (e.g., an antenna coil and capacitance). In the conventional LFI system, the power supply provides power (i.e., supply voltage and current) to the data generator and the output driver. The data generator presents signals to the output driver. The output driver amplifies the signals and presents the amplified signals to the resonant circuit and the resonant circuit wirelessly presents the signals to the tire monitor devices via the LFI electromagnetic field. In response to the LFI signals, the tire devices transmit signals related to tire identification, tire pressure, tire temperature, etc.

To generate a magnetic field having sufficient magnitude to wirelessly communicate with the tire monitor devices, the conventional LFI system power supply presents a relatively high current to the output driver. Since the output driver current is relatively high, the supply voltage presented to the output driver is typically unregulated battery voltage. The unregulated output driver supply voltage can vary between approximately 9 VDC and 16 VDC in typical conventional vehicle tire pressure monitor system applications. Since the magnetic field strength varies directly with the output driver supply power (i.e., voltage and current), the output driver supply voltage variation can cause a variation in the magnetic field strength. Furthermore, changes is vehicle operation conditions (e.g., ice, mud, or snow buildup in wheel wells where the LFIs are installed, changes in temperature, changes in tire orientation as wheels turn, etc.) can alter electromagnetic field strength in the wireless communication path between the LFI and the respective tire.

The conventional LFI system is configured to provide adequate magnetic field strength for proper system operation at the lowest output driver supply voltage. However, as the supply voltage increases the conventional LFI system generates higher strength magnetic fields. In particular, at higher output driver supply voltage levels the conventional LFI systems can present magnetic fields that generate electromagnetic interference (EMI) with other modules and/or circuits in the vehicle where the conventional LFI system is implemented. In addition, the higher output driver supply voltage levels can consume excessive power from the vehicle battery. Conventional approaches at limiting the upper level of the magnetic field amplitude typically include regulation of the LFI supply voltage. However, regulation of the LFI supply voltage is costly and can generate excessive heat in the LFI.

Thus, there exists a need for a magnetic field generator that has a relatively fixed field strength when the input voltage to the generator varies, generates the substantially minimum magnetic field that is adequate to actuate the magnetic field receivers and thereby generates the substantially minimum electromagnetic interference, reduces power consumption, minimizes heat generation, and/or adapts to variations in component, installation, operation, and/or environmental conditions.

SUMMARY OF THE INVENTION

Accordingly, the present invention may provide an improved system and method for an adaptive, variable low frequency initiator magnetic field generator where the system includes a magnetic field generator for generating a magnetic field for receipt by a responsive device and a controller in communication with the magnetic field generator for determining a strength of the magnetic field to a level sufficient for use in controlling the responsive device, thereby minimizing electromagnetic interference, reducing power consumption, reducing heat generation, and/or reducing cost when compared to conventional approaches.

According to the present invention, a system for controlling a magnetic field strength is provided comprising a magnetic field generator for generating a magnetic field for receipt by a responsive device and a controller in communication with the magnetic field generator for determining a strength of the magnetic field to a level sufficient for use in controlling the responsive device Also according to the present invention, a method for controlling a magnetic field strength is provided comprising generating a magnetic field for receipt by a responsive device and adjusting the strength of the magnetic field to a level sufficient for use in controlling the responsive device.

The above features, and other features and advantages of the present invention are readily apparent from the following detailed descriptions thereof when taken in connection with the accompanying drawings.

DETAILED DESCRIPTION OF THE PREFERRED EMBODIMENT(S)

With reference to the Figures, the preferred embodiments of the present invention will now be described in detail. Generally, the present invention provides a low frequency initiator (LFI) system having adaptive, variable magnetic field generation. The adaptive, variable magnetic field generation of the present invention may have a relatively fixed field strength when the input voltage to a magnetic field generator varies, generate a substantially minimum magnetic field that is adequate to actuate magnetic field receivers and thereby minimize electromagnetic interference (EMI), reduce power consumption, and/or adapt to variations in component, installation, and/or environmental conditions.

The present invention may be advantageously implemented in connection with a vehicle tire pressure monitoring system. However, the present invention may be implemented in connection with any appropriate magnetic field generation implementation to meet the design criteria of a particular application.

Figure 1:
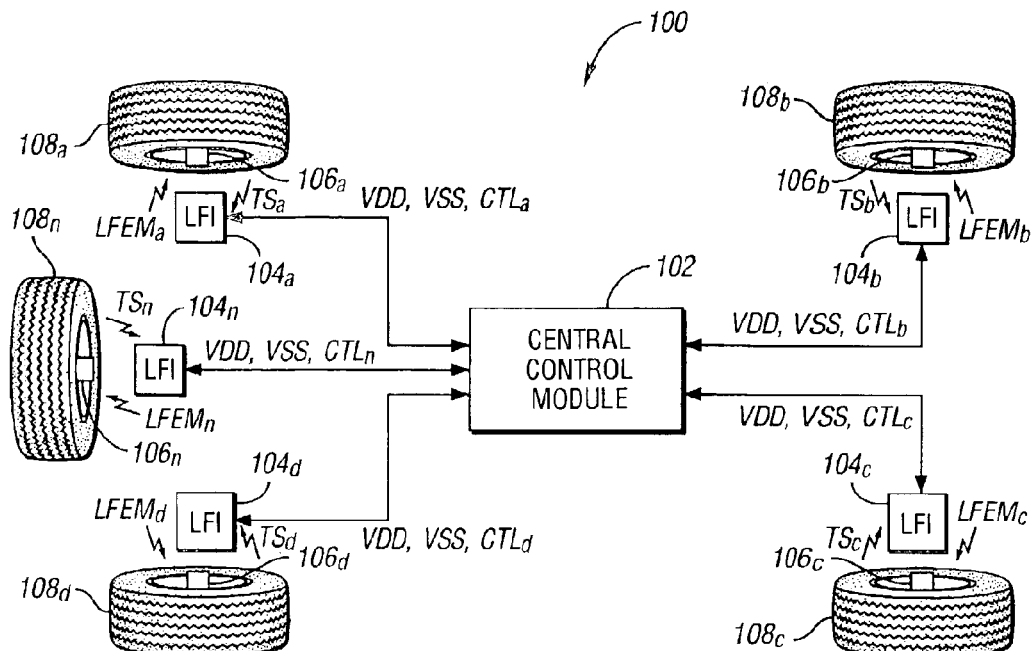
FIG. 1 is a diagram of an example implementation of the present invention.

Referring to FIG. 1, a diagram illustrating a vehicle tire pressure monitoring system 100 in accordance with a preferred embodiment of the present invention is shown. The system 100 generally comprises a central control module 102, a plurality of low frequency initiators (LFIs) 104 (e.g., LFIs 104a–104n), a plurality of tire monitor devices 106 (e.g., devices 106a–106n), and a plurality of tires 108 (e.g., tires 108a–108n). The module 102 may be implemented as a standalone module. However, the module 102 may be implemented in connection with any appropriate module and/or circuitry to meet the design criteria of a particular application. The module 102 generally communicates with at least one other module, interface, controller, etc. (not shown) within the vehicle where the system 100 is implemented to perform a number of operations (e.g., tire pressure monitoring, tire temperature monitoring, tire rotation monitoring, etc.).

The LFIs 104 are generally connected to the module 102. The LFIs 104 are generally disposed (e.g., mounted, installed, positioned, etc.) in proximity to the respective tires 108. The devices 106 are generally disposed within the respective tires 108. The devices 106 are generally configured to provide data (i.e., information) that relates to the respective tires 108 (e.g., tire identification, tire pressure, tire temperature, etc.). The LFIs 104 are generally magnetic field generators that communicate wirelessly with the respective responsive devices 106 via low frequency electromagnetic waves. The devices 106 are generally configured to communicate wirelessly with at least one other module, interface, controller, etc. (not shown) within the vehicle where the system 100 is implemented.

The module 102 may present signals (e.g., VDD, VSS and/or CTLa-CTLn) to the LFIs 104. The signal VDD may be implemented as the battery (i.e., supply) voltage and the signal VSS may be implemented as the power supply (or vehicle) electrical ground potential. The signals CTLa-CTLn may be implemented as at least one control signal. The signals CTLa-CTLn may be implemented as bus signals, serial control signals, etc. However, the signals CTLa-CTLn may be implemented as any appropriate control signals to meet the design criteria of a particular application. The signals CTLa-CTLn generally control at least one operation (e.g., a transmit operation) of the respective LFIs 104a–104n.

The LFIs 104a–104n may be configured to wirelessly transmit a respective signal (e.g., LFEMa-LFEMn) in response to the respective signal CTLa-CTLn. The signal LFEM may be implemented as at least one control signal. The signal LFEM is generally implemented via a magnetic field (i.e., a low frequency electromagnetic wave). The signal LFEM may control at least one operation of the respective device 106 (e.g., a transmit operation).

The devices 106a–106n may be configure to generate a respective signal (e.g., TSa-TSn) in response to the signals LFEMa-LFEMn. The devices 106 may also be configured to generate the signal TS in response to other parameters (e.g., after a predetermined time, periodically, in response to other wireless signals (not shown), etc.). The signal TS may be implemented as a data signal that provides information (e.g., tire pressure, tire temperature, tire identification such that each tire device 106 (and the respective tire 108) is uniquely identified, etc.). The signal TS is generally wirelessly communicated to and from the module 102 and/or with the at least one other module, interface, controller, etc. within the vehicle where the system 100 is implemented. Since the device 106 is generally configured to generate the signal TS in response to the signal LFEM, a battery (not shown) that is generally implemented in connection with the device 106 internally within the tire 108 may have improved life when compared with the battery implemented in conventional LFI approaches.

Figure 2:
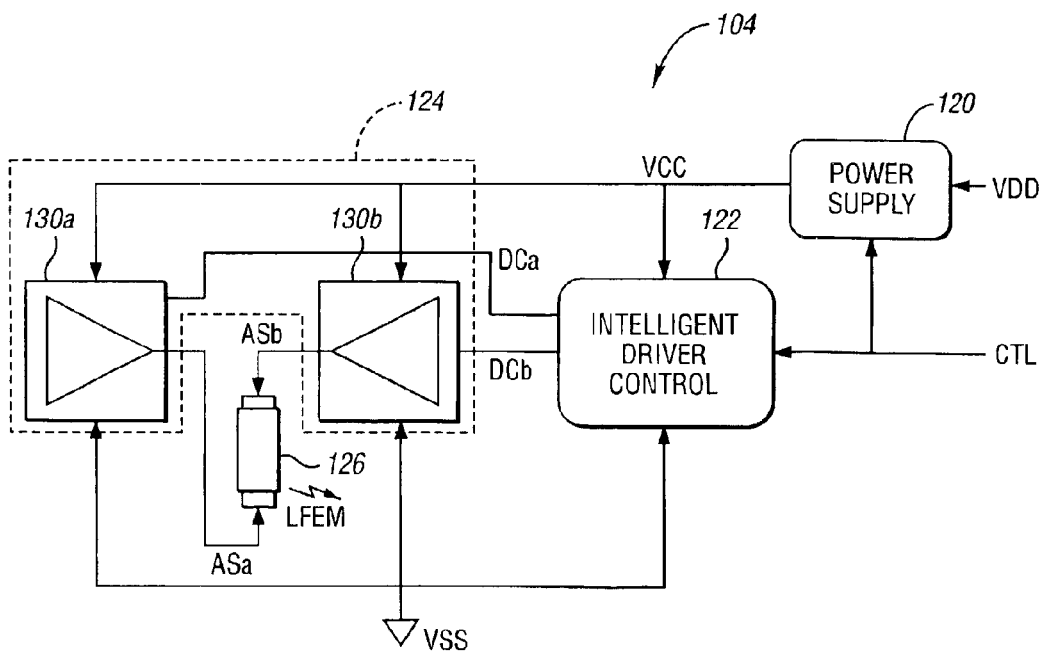
FIG. 2 is a diagram of a preferred embodiment of the present invention.

Referring to FIG. 2, a diagram illustrating an LFI 104 of the present invention is shown. The LFI 104 generally comprises a power supply 120, a driver controller 122, a driver circuit 124, and a resonant circuit (e.g., antenna, coil and capacitance, etc.) 126. The power supply 120 may have an input that may receive the supply voltage VDD, an input that may receive the signal CTL, and an output that may present a signal (e.g., VCC). The signal VCC may be implemented as a supply voltage. The signal VCC is generally presented at an amplitude that provides the LFI 104 sufficient power to generate the signal LFEM at an amplitude such that the system 100 may perform at least one normal operation. The power supply 120 may be configured to present the supply voltage VCC (i.e., turn on) in response to the supply voltage VDD and the signal CTL (i.e., the supply voltage VCC may be switched on and off in response to the signal CTL).

The power supply 120 is not generally configured to provide high voltage regulation to the supply voltage VDD. The power supply 120 is generally lower in cost and does not have excessive heat generation as is typical in many conventional LFI power supplies.

The driver controller 122 may have an input that may receive the supply voltage VCC, an input that may receive the signal CTL, an input that may receive the ground potential VSS, and a pair of outputs that may present a pair of signals (e.g., DCa and DCb). The signals DCa and DCb may be implemented as control signals. The driver controller 122 may be configured to present the signals DCa and DCb in response to the signal CTL.

The driver 124 may have a pair of inputs that may receive the signals DCa and DCb, an input that may receive the supply voltage VCC, an input that may receive the ground potential VSS, and a pair of outputs that may present a pair of signals (e.g., ASa and ASb). The signals ASa and ASb may be implemented as complementary portions of an antenna (or resonant circuit) current signal. The circuit 124 may be configured to generate and present the signals ASa and ASb in response to the supply voltage VCC and the signals DCa and DCb, respectively.

The resonant circuit 126 may have a pair of inputs that may receive the signals (or currents) ASa and ASb and the antenna 126 may wirelessly transmit (e.g., radiate, present, etc.) the signal LFEM. The resonant circuit 126 may be configured to transmit the signal LFEM in response to the signals ASa and ASb.

The driver 124 generally comprises a pair of amplifiers (or amplifier sections or stages) 130 (e.g., amplifiers 130a and 130b). The amplifiers 130a and 130b are generally implemented similarly. Each section (or stage) 130 may have an input that may receive the supply voltage VCC, an input that may receive the ground potential VSS, an input that may receive the respective control signal DC, and an output that may present the respective current signal AS.

The driver controller 122 generally controls the output signal LFEM via adjustment (i.e., modification, variation, control, etc.) of the resonant circuit 126 current signals ASa and/or ASb in response to the control signals DCa and/or DCb. The signal LFEM is generally adaptively variable. The signal LFEM is generally controlled (or adjusted) such that the system 100 of the present invention provides a sufficient and not excessive magnitude to the output signal LFEM (i.e., the respective magnetic field) for operation of the LFI signal receivers in the tire devices 106 during all normally anticipated operating conditions while minimizing EMI. In contrast, conventional LFI systems can generate excessive magnetic fields during some operating conditions (e.g., vehicle battery voltages that exceed a nominal range) and inadequate magnetic fields during other operating conditions (e.g., when the temperature of the conventional LFI is elevated, when the battery voltage is below a nominal range, during some wheel turns, when ice, mud, snow, etc. build up in the proximity of the LFI, etc.). In so-called 12 V vehicle systems, the nominal battery voltage range may be 9.0 V to 13.8 V.

Referring to FIGS. 3(a–d), diagrams illustrating a waveform 200 of the present invention are shown. The waveform 200 generally corresponds to the control signals DCa and DCb, the respective current signals ASa and ASb, and/or the respective signals LFEMa-LFEMn. The waveform 200 generally has a zero value (or amplitude) 202, a positive peak amplitude 204, and a negative peak amplitude 206. The amplitude 202 generally corresponds (or relates) to the supply ground potential VSS. The positive portion of the waveform 200 generally corresponds to the positive levels of the signals LFEM, DCa, and/or ASa and the negative portion of the waveform 200 generally corresponds to the negative levels of the signals LFEM, DCb, and/or ASb. The amplitudes 202–204 and 202–206 generally have the similar absolute values. However, the amplitudes 202–204 and 202–206 may be implemented having different absolute values (e.g., via dissimilar circuits 130a and 130b) to meet the design criteria of a particular application. The waveform 200 generally has a carrier frequency for use in conveying information (e.g., via modulation).

Figure 3A:
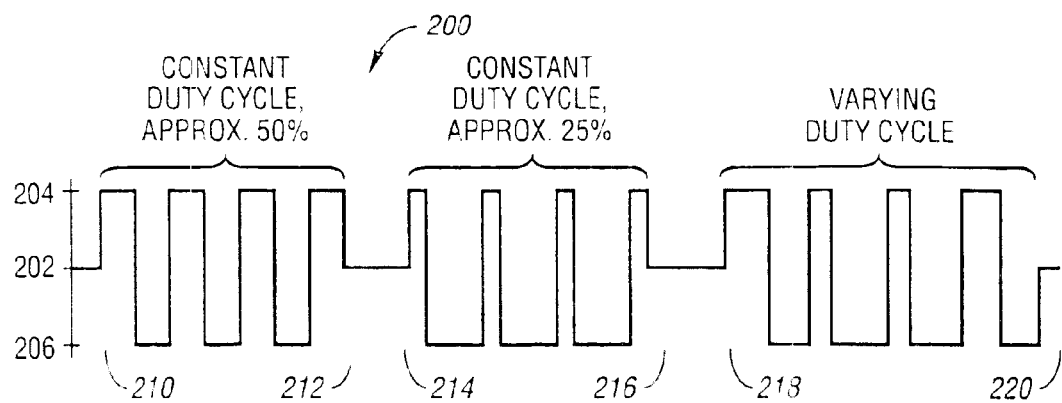
FIGS. 3(a–d) are diagrams of waveforms of the present invention.

Referring to FIG. 3a, during one example mode of operation, the system 100 may control (or adjust) the magnetic field strength transmitted by the LFI 104 (i.e., the power of the signal LFEM) via pulse width modulation (PWM) of the signal LFEM carrier frequency. The pulse width modulation (PWM) of the signal LFEM carrier frequency may be implemented via variation (or adjustment) of the waveform 200 duty cycle (e.g., a ratio of time the waveform 200 is positive to the total cycle time of the waveform 200) such that average (or RMS) power of the signal LFEM is varied to meet the design criteria of the particular application for the current operating conditions. In one example (e.g., during time intervals 210–212 and 214–216), the duty cycle of the signal LFEM may be constant during the assertion of the signal CTL. In another example (e.g., during time interval 218–220), the duty cycle of the signal LFEM may be selectively (or adaptively) adjusted to meet the magnetic field strength power design criteria of the particular application and the operating conditions. In yet example (not shown), the duty cycle of the waveform 200 may be adjusted periodically (e.g., at every other cycle, every third cycle, every fourth cycle, etc.).

Figure 3B:
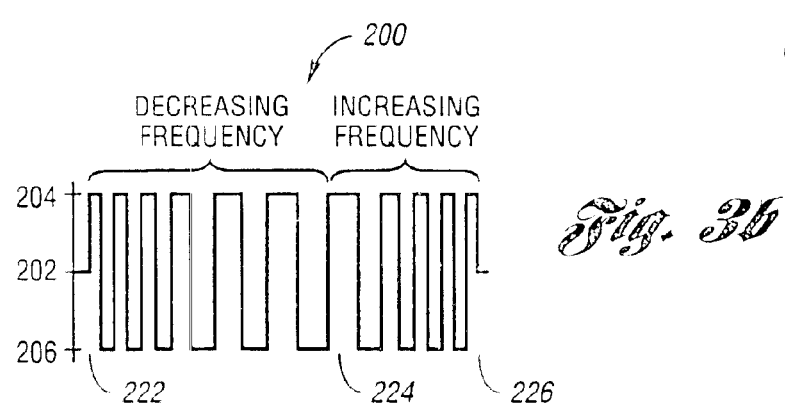

Referring to FIG. 3b, during another example mode of operation, the system 100 may control (or adjust) the magnetic field strength transmitted by the LFI 104 (i.e., the power of the signal LFEM) via variation (or adjustment) of the signal LFEM carrier frequency (or period) or pulse timing. The adjustment of the signal LFEM carrier frequency may be implemented such that the average (or RMS) power of the signal LFEM is varied to meet the design criteria and the current operating conditions. The carrier frequency of the signal LFEM may be decreased during a time interval 222–224 and increased during time interval 224–226. The carrier frequency of the signal LFEM may be adjusted during the assertion of the signal CTL. Alternatively, the carrier frequency adjustment of the signal LFEM may be alternated (e.g., decreased then increased or vice versa) at different assertions of the signal CTL (not shown). In yet another example (not shown), the carrier frequency of the signal LFEM-may be adjusted (or modified) on a cycle by cycle basis of the signal LFEM (e.g., at every other cycle, every third cycle, every fourth cycle, etc.).

Figure 3C:
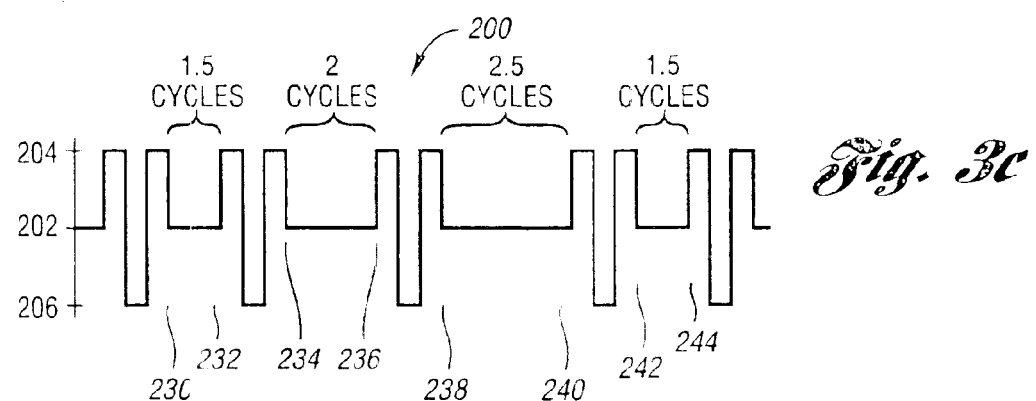

Referring to FIG. 3c, during another example mode of operation, the system 100 may control (or adjust) the magnetic field strength transmitted by the LFI 104 (i.e., the power of the signal LFEM) via variation (or adjustment) of a delay between turn on and turn off of the driver circuit 124 (or omission of cycles of the signal LFEM). The delay may be implemented via the driver controller 122 monitoring pulse edges of the signals DCa and DCb. For example, the driver 124 turn off to turn on time may be delayed by 1.5 cycles during time interval 230–232, 2 cycles during time interval 234–236, 2.5 cycles during time interval 238–240 and 1.5 cycles during time interval 242–244. During the delay between turn off and turn on the resonant circuit 126 coil may discharge more completely and thus reduce peak output power. In one example, the coil of the resonant circuit 126 may be opened (i.e., the magnetic field strength of the signal LFEM may be selectively varied) via floating the driver 124 output (e.g., placing an output of the driver 124 in a high impedance state).

Figure 3D:
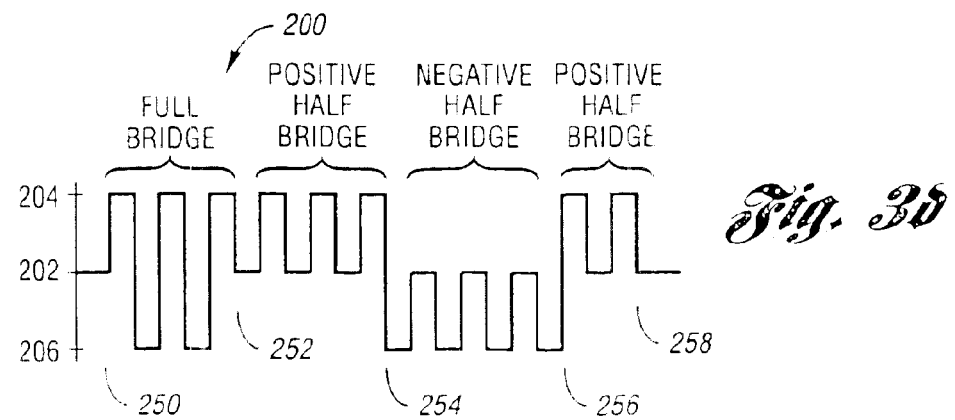

Referring to FIG. 3d, during yet another example mode of operation, the system 100 may control (or adjust) the magnetic field strength transmitted by the LFI 104 (i.e., the power of the signal LFEM) via switching between operating the driver circuit 124 in a single-ended or half-bridge mode (i.e., operating only one of the circuits 130a and 130b) and in a double-ended or full-bridge mode (i.e., operating both of the circuits 130a and 130b). The circuit 124 may be operated in a full-bridge mode during time interval 250–252. The circuit 124 may be operated in a half-bridge mode during time intervals 252–254 (positive), 254–256 (negative), and 256–258 (positive). The full-bridge mode of operation may effectively double the operating voltage of the resonant circuit 126.

The system 100 may be operated in any of the modes described in connection with FIGS. 3(a–d) singularly or in any combination thereof. In one example, the system 100 may control (or adjust) the power (i.e., magnetic field strength) of the signal LFEM via a combination of PWM (e.g., as illustrated in FIG. 3a) and half-bridge or full-bridge transmission (e.g., as illustrated in FIG. 3d). In another example, the system 100 may control (or adjust) the power (i.e., magnetic field strength) of the signal LFEM via a combination of PWM (e.g., as illustrated in FIG. 3a) and transmission delay (e.g., as illustrated in FIG. 3c). However, the system 100 may be operated in any of the modes described in connection with FIGS. 3(a–d) singularly or in an appropriate combination to meet the design criteria of a particular application. Since the system 100 may be operated in the various modes alone or in any combination, the system 100 generally provides improved resolution when compared to conventional LFI approaches.

Figure 4A:
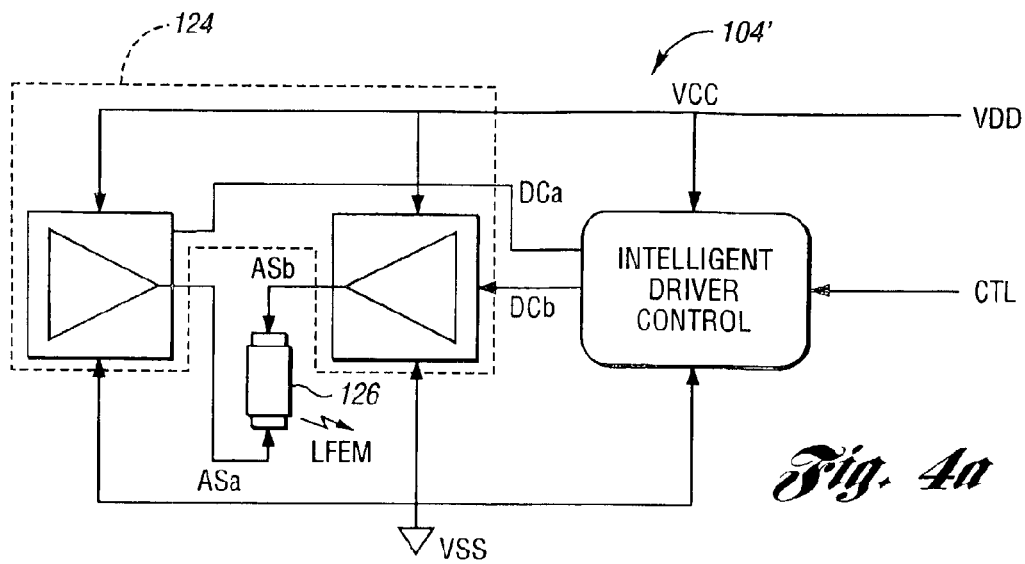
FIGS. 4(a–c) are alternative embodiments of the present invention.

Referring to FIGS. 4(a–c), alternative embodiments of the LFI 104 (e.g., LFI 104', LFI 104", and LFI 104''') are shown. The LFIs 104', 104", and 104''' are generally implemented similarly to the LFI 104. As illustrated in FIG. 4a, the LFI 104' is generally implemented without the power supply 120. The circuits 122 and 124 may receive the supply voltage VDD instead of the supply voltage VCC.

Figure 4B:
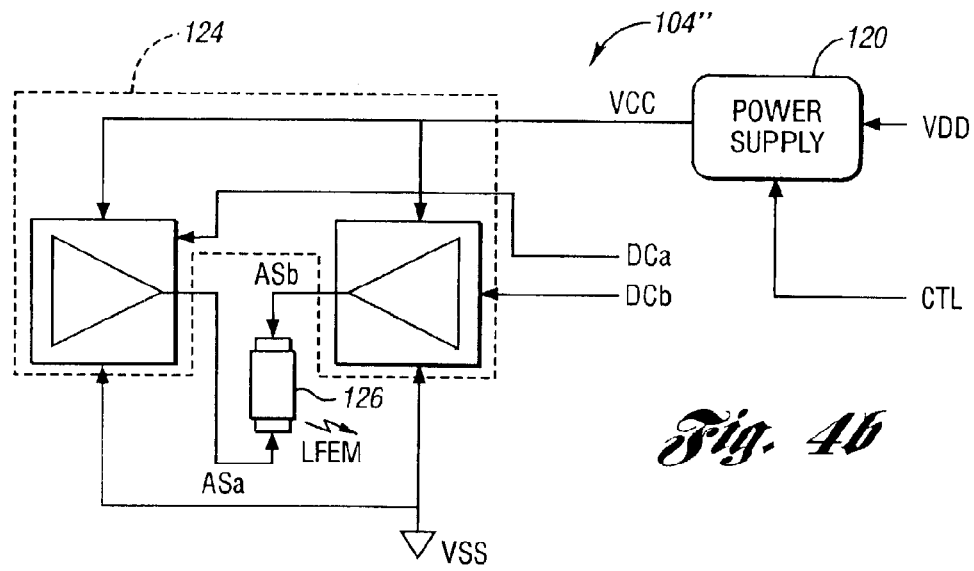
Figure 4C:
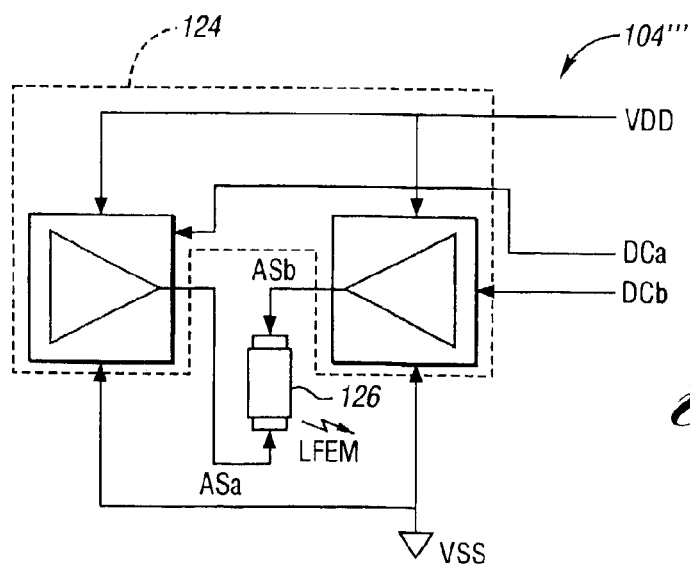

Referring to FIG. 4b, the LFI 104" is generally implemented without the driver controller 122. The circuit 124 may receive the signals DCa and DCb from a modified version of the controller 102 (not shown). As illustrated in FIG. 4c, the LFI 104''' is generally implemented without the power supply 120 and the driver controller 122. In the case of implementation of the LFI 104''', the circuits 122 and 124 may receive the supply voltage VDD instead of the supply voltage VCC and the circuit 122 may receive the signals DCa and DCb from the modified version of the controller 102.

In one example, the system 100 may determine the level of the magnetic field strength of the signal LFEM via monitoring (or sensing) the level and/or operating parameters (e.g., turn on time) of the current signals ASa and/or ASb (e.g., via the controller 122) (i.e., the controller 122 may operate as a current sensor configured to sense the amplitude of the current AS).

In another example, the system 100 may determine the level of the magnetic field strength of the signal LFEM via assertion of the signal CTL and incremental increasing of the level of the signals ASa and/or ASb to incrementally increase the magnetic field strength of the signal LFEM via adjusting parameters (e.g., driver 124 turn on time, signal LFEM carrier frequency or duty cycle, etc.) until the responsive devices 106 respond (e.g., transmit the signal TS). The routine, process, method, etc. for determining and/or monitoring the level of the magnetic field strength of the signal LFEM may be implemented within the driver 122, the controller 102, and/or any other appropriate circuit to meet the design criteria of a particular application.

Since the system 100 of the present invention may continuously monitor and/or adjust the level of the magnetic field strength of the signal LFEM, the present invention may provide a system and a method for an adaptive, variable magnetic field generator (e.g., the LFI 104). The system 100 is generally configured such that the level of the magnetic field strength of the signal LFEM is adaptive at each LFI 104 and the respective tire device 106 to meet the design criteria of the application and the operating conditions.

While the present invention has been described in connection with a vehicle tire pressure monitoring system having a plurality of LFIs 104, the present invention may be advantageously implemented in connection with any appropriate magnetic field generation implementation having at least one LFI 104 to meet the design criteria of a particular application.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for controlling a magnetic field strength, the system comprising:
   a magnetic field generator for generating a magnetic field for receipt by a responsive device, wherein the responsive device comprises a tire monitor device; and
   a controller in communication with the magnetic field generator for determining a strength of the magnetic field and generating a control signal operative to adjust the strength of the magnetic field to a level sufficient for use in controlling the responsive device, wherein the magnetic field generator comprises a driver circuit and the control signal is operative to adjust the magnetic field strength to the level sufficient for use in controlling the responsive device by incrementally increasing the magnetic field until the responsive device responds.

2. The system of claim 1 wherein the generator comprises a low frequency initiator.

3. The system of claim 2 wherein the initiator comprises the controller.

4. The system of claim 1 wherein the generator includes a coil and the controller includes a current sensor for sensing current in the coil to determine the magnetic field strength.

5. The system of claim 1 wherein the magnetic field comprises a carrier frequency for use in conveying information to the responsive device and the control signal is operative to adjust the strength of the magnetic field by varying a pulse width modulation of the carrier frequency.

6. The system of claim 1, wherein the control signal is operative to adjust the strength of the magnetic field by selectively varying the carrier frequency period.

7. The system of claim 6 wherein the strength of the magnetic field is selectively varied on a cycle by cycle basis.

8. The system of claim 7 wherein the driver circuit comprises first and second sections and the control signal is operative to adjust the magnetic field strength by selective activation of either one or both of the first and second sections.

9. The system of claim 6 wherein the control signal is operative to adjust the magnetic field strength by varying a delay between activation and deactivation of the driver circuit.

10. The system of claim 9 wherein the magnetic field strength is selectively varied by placing an output of the driver in a high impedance state.

11. The system of claim 1 wherein the magnetic field strength is variable and is at least a minimum level sufficient for use in controlling the responsive device.

12. The system of claim 1 wherein the magnetic field strength level sufficient for use in controlling the responsive device remains constant with varying input voltage to the magnetic field generator.

13. The system of claim 1 wherein the magnetic field strength level is varied in response to operating conditions where the system is implemented.

14. A method for controlling a magnetic field strength, the method comprising:
   generating a magnetic field for receipt by a responsive device, wherein the responsive device comprises a tire monitor device;
   determining a strength of the magnetic field;
   generating a control signal; and
   adjusting the strength of the magnetic field to a level sufficient for use in controlling the responsive device, wherein the magnetic field is generated using a generator comprising a driver circuit and the control signal is operative to adjust the magnetic field strength to the level sufficient for use in controlling the responsive device by incrementally increasing the magnetic field until the responsive device responds.

15. The method of claim 14 wherein the magnetic field is generated by a low frequency initiator.

16. The method of claim 14 wherein the magnetic field comprises a carrier frequency for use in conveying information to the responsive device and adjusting the strength of the magnetic field comprises varying a pulse width modulation of the carrier frequency.

17. The method of claim 16 wherein adjusting the strength of the magnetic field further comprises selectively varying the carrier frequency period.

18. The method of claim 17 wherein the carrier frequency is selectively varied on a cycle by cycle basis.

19. The method of claim 17 wherein adjusting the magnetic field strength comprises varying a delay between activation and deactivation of the driver circuit.

20. The method of claim 19 wherein adjusting the magnetic field strength comprises selectively placing the driver in a high impedance state.

21. The method of claim 19 wherein the driver circuit comprises first and second sections and adjusting the magnetic field strength comprises selectively activating one of either or both of the first and second sections.

* * * * *